(12) United States Patent
Shigeta

(10) Patent No.: US 12,380,767 B2
(45) Date of Patent: Aug. 5, 2025

(54) MANAGEMENT SYSTEM FOR SUBSTITUTE CURRENCY FOR GAMING

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 18/422,686

(22) Filed: Jan. 25, 2024

(65) Prior Publication Data
US 2024/0161579 A1    May 16, 2024

Related U.S. Application Data

(63) Continuation of application No. 17/273,623, filed as application No. PCT/JP2019/033301 on Aug. 26, 2019, now Pat. No. 11,948,430.

(30) Foreign Application Priority Data

Sep. 6, 2018 (JP) .................................. 2018-182857

(51) Int. Cl.
*G07F 17/32* (2006.01)
*G06K 19/07* (2006.01)
(Continued)

(52) U.S. Cl.
CPC ..... *G07F 17/3251* (2013.01); *G06K 19/0723* (2013.01); *G06K 19/07722* (2013.01); *G06N 20/00* (2019.01); *G07F 17/3241* (2013.01)

(58) Field of Classification Search
CPC ............. G07F 17/3251; G07F 17/3241; G07F 17/3234; G07F 17/3244; G07F 17/3223;
(Continued)

(56) References Cited

U.S. PATENT DOCUMENTS

| 7,793,837 B1* | 9/2010 | Faith ...................... B42D 25/45 |
| | | 235/382 |
| 2007/0118822 A1 | 5/2007 | Ito et al. |

(Continued)

FOREIGN PATENT DOCUMENTS

| CN | 201741202 U | 2/2011 |
| CN | 203397381 U | 1/2014 |

(Continued)

OTHER PUBLICATIONS

International Search Report issued on Nov. 12, 2019 issued in PCT Application PCT/JP2019/033301.
(Continued)

*Primary Examiner* — Peter J Iannuzzi
(74) *Attorney, Agent, or Firm* — NORTON ROSE FULBRIGHT US LLP

(57) ABSTRACT

The management system for substitute currency includes a pattern acquiring device configured to acquire an image of the ground pattern of the substitute currency, a reading device configured to read an ID of the substitute currency, and a control device configured to associate a pattern of the ground pattern with the ID and store the associated pattern and ID in a database. The control device is configured to analyze the image of the ground pattern acquired by the pattern acquiring device to identify the pattern, and determine, based on the database, whether the pattern of the ground pattern of the substitute currency matches the pattern of the ground pattern associated with the ID of the substitute currency obtained from the reading device, thereby to determine authenticity of the substitute currency.

13 Claims, 11 Drawing Sheets

(51) Int. Cl.
*G06K 19/077* (2006.01)
*G06N 20/00* (2019.01)

(58) Field of Classification Search
CPC ............ G07F 17/3248; G06K 19/0723; G06K 19/07722; G06K 19/047; G06N 20/00; A63F 3/00157; A63F 2003/00703; A63F 3/00697; A63F 2003/00845; A63F 2009/2489; A63F 2250/58; A44C 21/00
See application file for complete search history.

(56) References Cited

U.S. PATENT DOCUMENTS

| | | | |
|---|---|---|---|
| 2012/0243797 | A1 | 9/2012 | Di Venuto Dayer et al. |
| 2013/0287267 | A1 | 10/2013 | Varone |
| 2015/0018083 | A1 | 1/2015 | Czyzewski et al. |
| 2015/0053755 | A1 | 2/2015 | Wood et al. |
| 2018/0053377 | A1 | 2/2018 | Shigeta |
| 2018/0114068 | A1* | 4/2018 | Balasundaram ........ G06T 7/143 |
| 2018/0114406 | A1 | 4/2018 | Shigeta |
| 2018/0122187 | A1* | 5/2018 | Moore ................ G07F 17/3248 |
| 2018/0144579 | A1 | 5/2018 | Shigeta |
| 2018/0357850 | A1* | 12/2018 | Moore ................ G07F 17/3211 |
| 2019/0043309 | A1 | 2/2019 | Shigeta |
| 2019/0392273 | A1 | 12/2019 | Shigeta |

FOREIGN PATENT DOCUMENTS

| | | |
|---|---|---|
| CN | 105190711 A | 12/2015 |
| CN | 107683494 A | 2/2018 |
| CN | 107808443 A | 3/2018 |
| CN | 108074357 A | 5/2018 |
| DE | 102014214548 A1 | 1/2016 |
| JP | 2004153405 A | 5/2004 |
| JP | 2011188915 A | 9/2011 |
| JP | 2017208032 A | 11/2017 |
| JP | 2018079311 A | 5/2018 |
| WO | 03034355 A1 | 4/2003 |
| WO | 2003030097 A1 | 4/2003 |
| WO | 2004070667 A2 | 8/2004 |
| WO | 2016108637 A1 | 7/2016 |
| WO | 2017135103 A1 | 8/2017 |
| WO | 2018147451 A1 | 8/2018 |

OTHER PUBLICATIONS

Australian Examination report No. 2 dated Mar. 16, 2022 issued in AU Application 2019335834.
European Partial EESR dated Apr. 21, 2022 issued in EP Application 19858374.2.
Chinese Office Action dated Jul. 26, 2022 issued in CN Application 202111093176.2.
Japanese Office Action dated Aug. 1, 2023 issued in JP Application 2022-168843.

* cited by examiner

Fig.6

| ID | FRONT PATTERN (4h) | BACK PATTERN (4t) |
|---|---|---|
| ⋮ | ⋮ | ⋮ |
| APX2018-3775 | | |
| APX2018-3776 | | |
| APX2018-3777 | | |
| ⋮ | ⋮ | ⋮ |

MANAGEMENT SYSTEM FOR SUBSTITUTE CURRENCY FOR GAMING

CROSS-REFERENCE OF RELATED APPLICATIONS

This application is a continuation of U.S. patent application Ser. No. 17/273,623 filed Mar. 4, 2021, which is a national phase application under 35 U.S.C. § 371 of International Application No. PCT/JP2019/033301 filed Aug. 26, 2019, which claims the benefit of JP Pat. App. No. 2018-182857 filed Sep. 6, 2018. The contents of each application are hereby incorporated by reference.

TECHNICAL FIELD

The present invention relates to substitute currency for gaming for use in casinos and other gaming facilities that use substitute currency for gaming, and to a system for managing substitute currency for gaming.

Among the many live table games played in casinos and gaming facilities are baccarat and blackjack. In casinos and gaming facilities, substitute currency for gaming is used for those games. In casinos and gaming facilities, game substitutes are exchanged for cash at designated exchange counters in casinos and gaming facilities, or at the game tables by exchange staff or dealers in charge of the game tables.

The use of counterfeit substitute currency for gaming should not occur in casinos. In order to prevent the use of counterfeit substitute currency for gaming in casinos, the management system for substitute currency for gaming described in International Application Publication No. WO2017/135103 registers the IDs of substitute currency for gaming to be used in a database in advance. If there is a situation where there is a new ID that did not exist in the database, or two or more identical IDs exist, the system determines the possibility of counterfeit.

SUMMARY

The present invention provides a management system or substitute currency for gaming used in casinos and gaming facilities to prevent the use of counterfeit substitute currency for gaming One of the purpose of the present invention is to prevent the use of counterfeit or fraudulent exchange of substitute currency for gaming in casinos and gaming facilities. In the conventional technology, it is possible to determine that at least one of the substitute currency for gaming is a fake when two or more substitute currency for gaming with the same ID are found by registering the individually identifiable unique ID attached to the substitute currency for gaming in a database in advance. However, it is not possible to directly distinguish between genuine and fake substitute currency for gaming Therefore, if only counterfeit substitute currency for gaming is used and genuine substitute currency for gaming is not used, it cannot be determined that it is a counterfeit, and the conventional technology cannot be a direct solution to prevent the use of counterfeit substitute currency for gaming.

In order to solve the above-mentioned conventional problems, the management system of the substitute currency for gaming of the present invention is as follows: the substitute currency for gaming has a ground pattern formed in the manufacturing process or material production process, and a unique ID that can be individually identified, the ground patterns have a pattern that is difficult to distinguish from each other at first glance, but is not completely identical, the substitute currency for gaming further has a multi-layered structure consisting of multiple layers of plastic including: a layer with the ground pattern; an indication plastic layer on which an indication of an amount of money, etc., of the substitute currency for gaming is printed, the layer with the ground pattern is located inside of the indication plastic layer, and the ground pattern can be visually recognized through the indication plastic layer, the management system comprises: a ground pattern acquisition device that acquires an image of the ground pattern via a camera; an ID reading device that reads the unique ID; and a management control device that associates the pattern of the ground pattern and the unique ID and stores them in a database, wherein the management control device identifies the pattern by analyzing the image of the ground pattern acquired by the ground pattern acquisition device, the management control device determines whether the identified pattern of the ground pattern of the substitute currency for gaming to be judged matches the pattern of the ground pattern associated with the unique ID of the substitute currency for gaming to be judged obtained from the ID reading device by searching the database, thereby to determine authenticity of the substitute currency for gaming.

Furthermore, the substitute currency for gaming has an opaque layer in the middle and a layer with a ground pattern on both sides across the opaque layer, wherein the layer with the ground pattern has patterns that are difficult to distinguish from each other at a glance but do not completely match each other, on a front surface and back surface, the management control device is configured to be able to associate in the database and manage at least three of the pattern of the ground pattern on the front surface of the substitute currency for gaming, the pattern of the ground pattern on the back surface of the substitute currency for gaming, and the unique ID.

Furthermore, the management control device determines whether the pattern of the ground pattern on the front and/or back surface of the substitute currency for gaming to be judged matches the pattern of the ground pattern on the front and/or back surface associated with the ID information of the substitute currency for gaming to be judged obtained from the ID reading device by searching the database, thereby to determine authenticity of the substitute currency for gaming.

Furthermore, the management control device may be configured to use an artificial intelligence-type device to identify the pattern of the ground pattern of the substitute currency for gaming by analyzing an image of the ground pattern of the substitute currency for gaming acquired by the ground pattern acquisition device.

Furthermore, the management control device is provided with a function of determining the pattern of the ground pattern of the substitute currency for gaming by using the relative positional relationship with the indication printed on the indication plastic layer.

Furthermore, the ground pattern may be a pearl pattern.

Furthermore, the ground pattern may be a lace pattern formed by a lace being crimped by the indication plastic layer.

Furthermore, the ground pattern may be formed by the printing dot pattern in the indication of the substitute currency for gaming.

Furthermore, the unique ID may be alphanumeric affixed to the surface of the substitute currency for gaming.

Furthermore, the unique ID may be an RFID.

Furthermore, the substitute currency for gaming has a unique alphanumeric ID attached to its surface and an RFID embedded in it, the management control device is provided with a function of allowing the ID information on the surface to be associated with the ID information of the RFID and managed in a database.

In order to further solve the above conventional problems, substitute currency for gaming has a ground pattern formed in a manufacturing process or a material manufacturing process; and a unique ID for individual identification, wherein the ground pattern has a pattern that is difficult to distinguish from each other at a glance but is not completely identical, and the substitute currency for gaming can be individually identified by determining the pattern and by reading the ID, and the substitute currency for gaming has a structure that allows information of the pattern in an image of the ground pattern and information of the ID to be associated and managed in a database.

In the above configuration, instead of inserting feature points, by using feature points that are formed naturally in the manufacturing process and are difficult to form intentionally, no one knows what the feature points are, or even though someone knows what the feature point is, it is difficult to counterfeit. In other words, it is difficult to know how to counterfeit because it is difficult to know what is being registered as a feature. In addition, if someone believes a feature is represented in a lace pattern when a feature is actually represented in a pearl pattern, and forcibly copies the feature to counterfeit, since it is a wrong feature, the counterfeit does not match any ID, or matches ID of the other.

BRIEF DESCRIPTION OF THE DRAWINGS

FIG. 6 shows an example of the contents of information stored in the database of an embodiment of the present invention.

DESCRIPTION OF EMBODIMENTS

The following is a description of embodiments of the present invention with reference to the drawings.

Though in this embodiment, the description is based on the assumption of a high-value substitute currency for gaming (mainly used in VIP rooms in casinos and generally rectangular in shape), which is generally called a "plaque" and for which the prevention of the use of counterfeit substitute currency for gaming is more important, the present invention can naturally be applied to the circular amusement substitute coins that are normally used.

Figure 1:
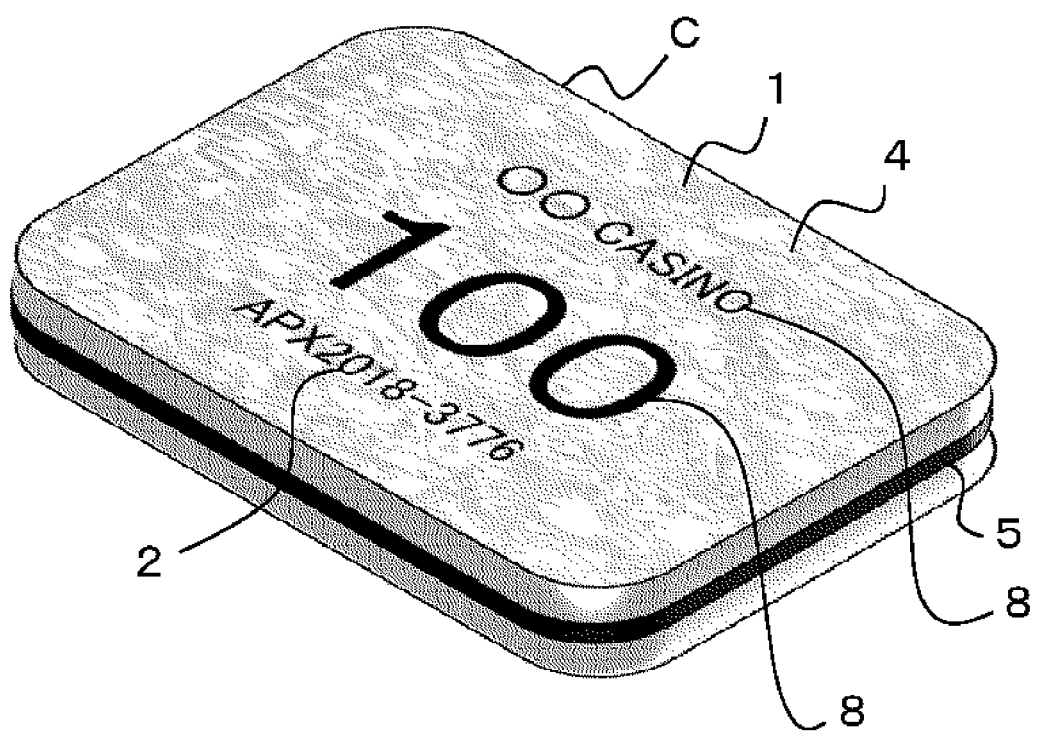
FIG. 1 is a diagram of substitute currency for gaming in an embodiment of the present invention.
Figure 2A:
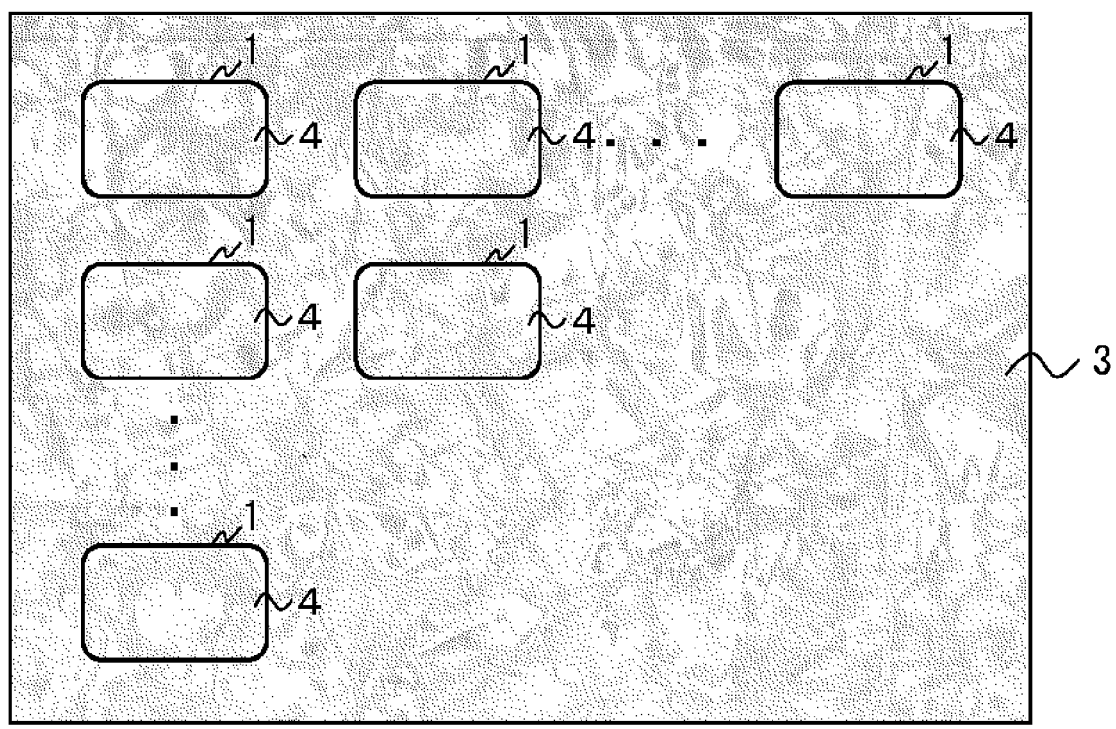
FIG. 2A is a plan view of a sheet-like material with a ground pattern of the present invention.
Figure 2B:
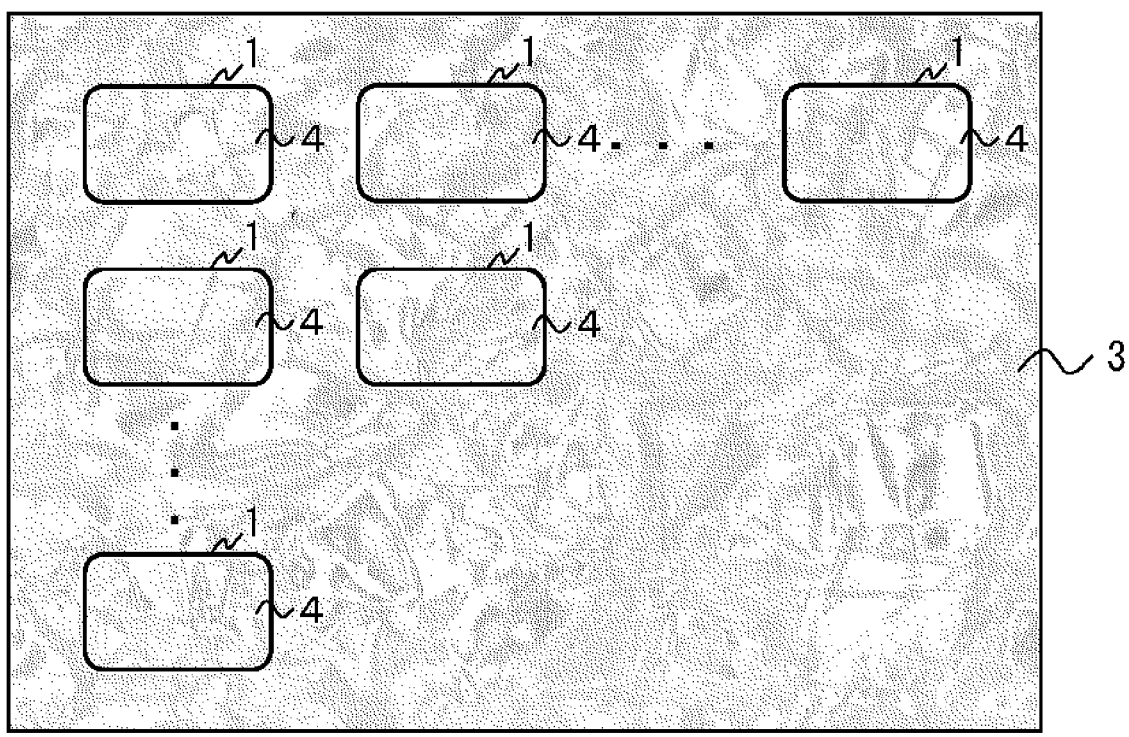
FIG. 2B is a plan view of a sheet-like member with a different pattern from that of the sheet-like member in FIG. 2A.
Figure 3A:
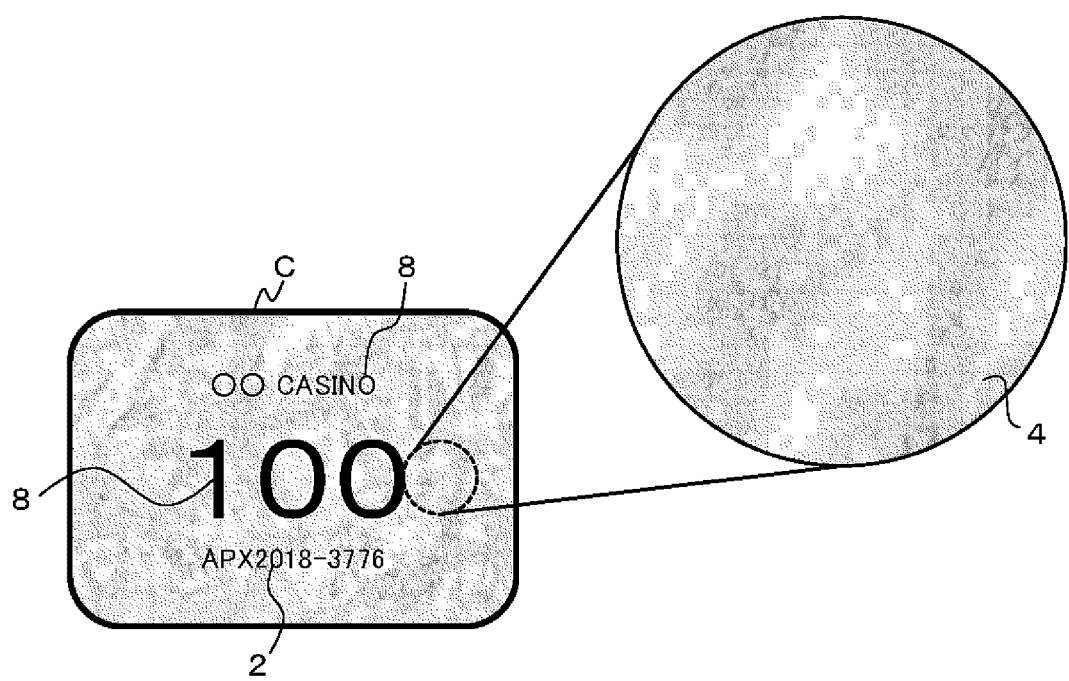
FIG. 3A is a plan view of the substitute currency for gaming.
Figure 3B:
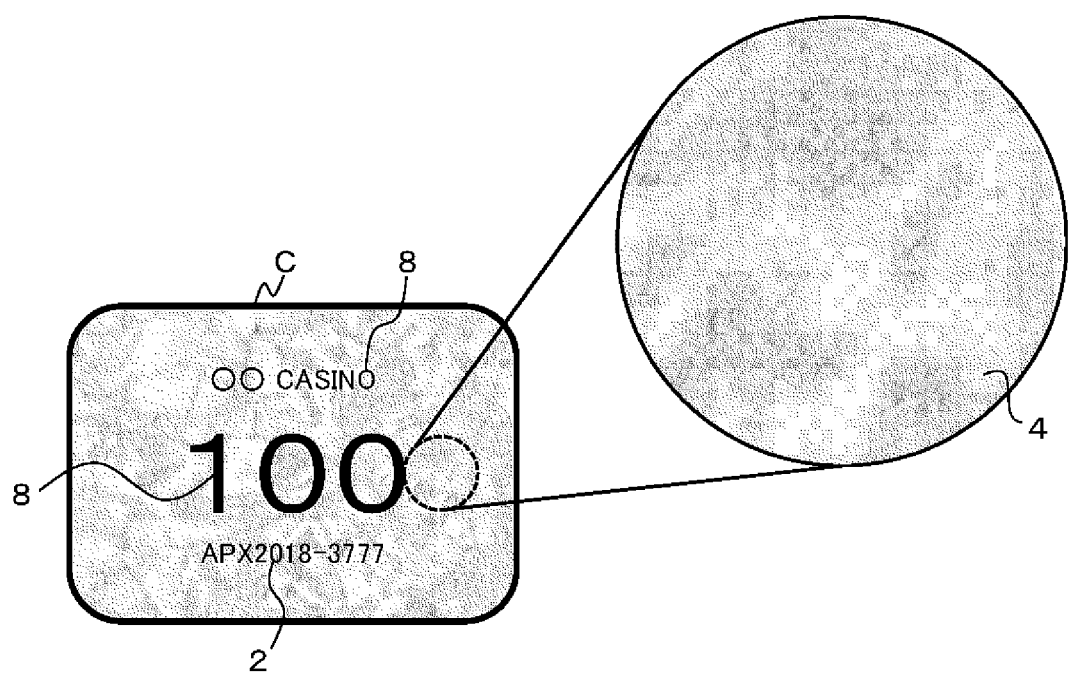
FIG. 3B is a plan view of a substitute currency for gaming with a different pattern from that of FIG. 3A.

First, the details of the substitute currency C for gaming used in the management system of the present invention will be explained. As shown in FIG. 1, the substitute currency C for gaming has a ground pattern 1 formed in the manufacturing process or the material manufacturing process, and also has a unique ID 2 that can be individually identified. The ground pattern 1 is formed by a sheet-like material 3 made by melting and pressing a number of resin pieces, which are the material, while overlapping each other, and then slicing them to a predetermined thickness, and has a pattern generally known as a pearl pattern P. Since the pearl pattern P is a decorative pattern that is naturally formed during the manufacturing process and can be created by chance, it differs from patterns created by printing, etc., even if they are created using the same manufacturing process, they will not be exactly the same pattern. Therefore, as shown in FIG. 2, there is a sense of unity in the pattern, and at a glance it is difficult to distinguish them from each other, but each sheet-like member 3 has a different pattern. For example, the pattern is different between the sheet-like member 3 shown in FIG. 2A and the sheet-like member 3 shown in FIG. 2B. Also, even within a single sheet material 3, each cut out area has a different pattern 4. As a result, as shown in FIGS. 3A and 3B, the ground pattern 1 of the substitute currency C for gaming has a pattern 4 that is difficult to distinguish from each other at a glance, but is not completely identical to each other.

Figure 4:
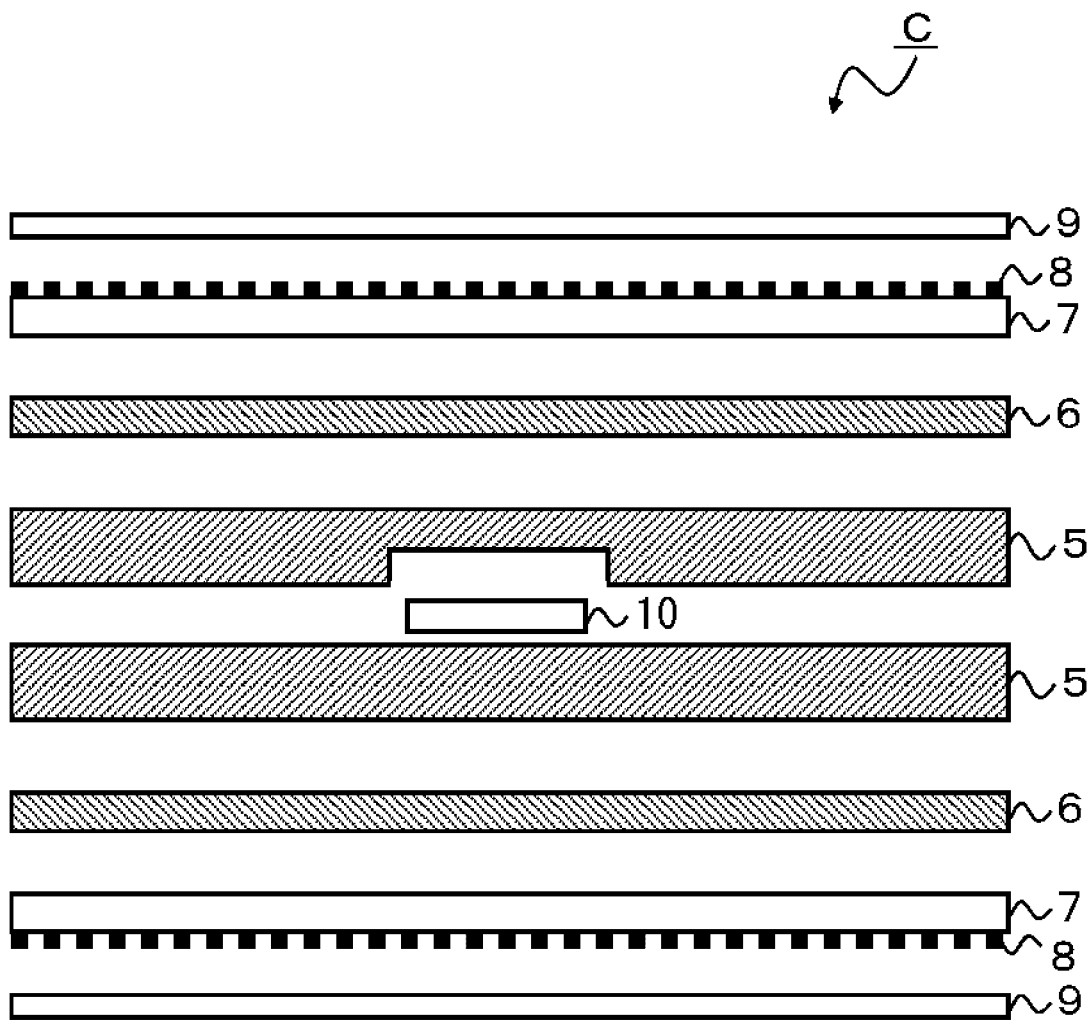
FIG. 4 is an exploded side view of the stacked structure of the substitute currency for gaming.

In addition, as shown in FIG. 4, the substitute currency C for gaming has a multi-layered structure consisting of multiple plastic layers. The substitute currency C for gaming has an opaque layer 5 in the middle. An RFID 10 is placed between the opaque layers 5. In addition to the value (amount or denomination) information of the substitute currency C for gaming, the RFID 10 stores unique ID information set for each casino or gaming facility, information related to manufacturing information such as the manufacturing line and manufacturing date, and individual ID information for each substitute currency C for gaming. In addition, the RFID 10 has information on individually identifiable unique ID 2, which is represented in alphanumeric characters on the surface of the substitute currency C for gaming, in place of or in addition to the unique ID 2. Two RFIDs 10 may be placed on a single substitute currency C for gaming. In particular, in the case of a rectangular plaque chip, placing two RFIDs in the longitudinal direction provides an advantage in reading.

The middle opaque layer 5 is flanked on both sides by a layer 6 with a ground pattern 1. The layer 6 with the ground pattern 1 can be a sheet-like material 3 as it is, or a sheet-like material 3 laminated to another plastic material. As described above, the ground pattern 1 has patterns 4 that are difficult to distinguish from each other at first glance, but are not completely consistent with each other. Therefore, the layer 6 having the ground pattern 1 has patterns 4 that are difficult to distinguish from each other at first glance, but are not completely consistent with each other, on its front surface and back surface respectively.

In addition, on the outside of each of the layers 6 having the ground pattern 1, there is an indication plastic layer 7 on which is printed an indication 8 representing the denomination, etc., of the substitute currency C for gaming. The indication plastic layer 7 is transparent or tinted transparent, and the layer 6 having the ground pattern 1 placed inside the indication plastic layer 7 is configured so that the ground pattern 1 can be seen through the indication plastic layer 7. In addition to the denomination information indicating the value of the substitute currency C for gaming, the indication 8 indicating the denomination, etc., may further indicates, for example, information distinguishing whether it is a rolling chip or a cash chip, junket information that differs for each junket and identifies the junket, casino information that differs for each casino and identifies the casino, etc. In addition, a transparent layer 9, which serves as a protective layer, is laminated to the outside of each of the indication plastic layers 7. The transparent layer 9 may be tinted transparent.

By using such a multilayer structure, the substitute currency C for gaming can form a striped pattern in the stacking direction on the side as shown in FIG. 1, and the type of substitute currency C for gaming can be identified by changing the color of the opaque layer 5 according to the type.

During the manufacture of the substitute currency C for gaming, thermo-compression bonding is performed with the plurality of members corresponding to each of the above layers stacked. This thermo-compression bonding causes the adjacent layers to be crimped together to form a multilayer laminate as a whole, which is punched into a predetermined shape, such as a rectangle or circle, by pressing or the like to form individual substitute currency C for gaming. When punching by pressing, R processing (round corners) is applied to the edge of the outermost layer by designing the dimensions of the die and punch for punching.

Figure 5:
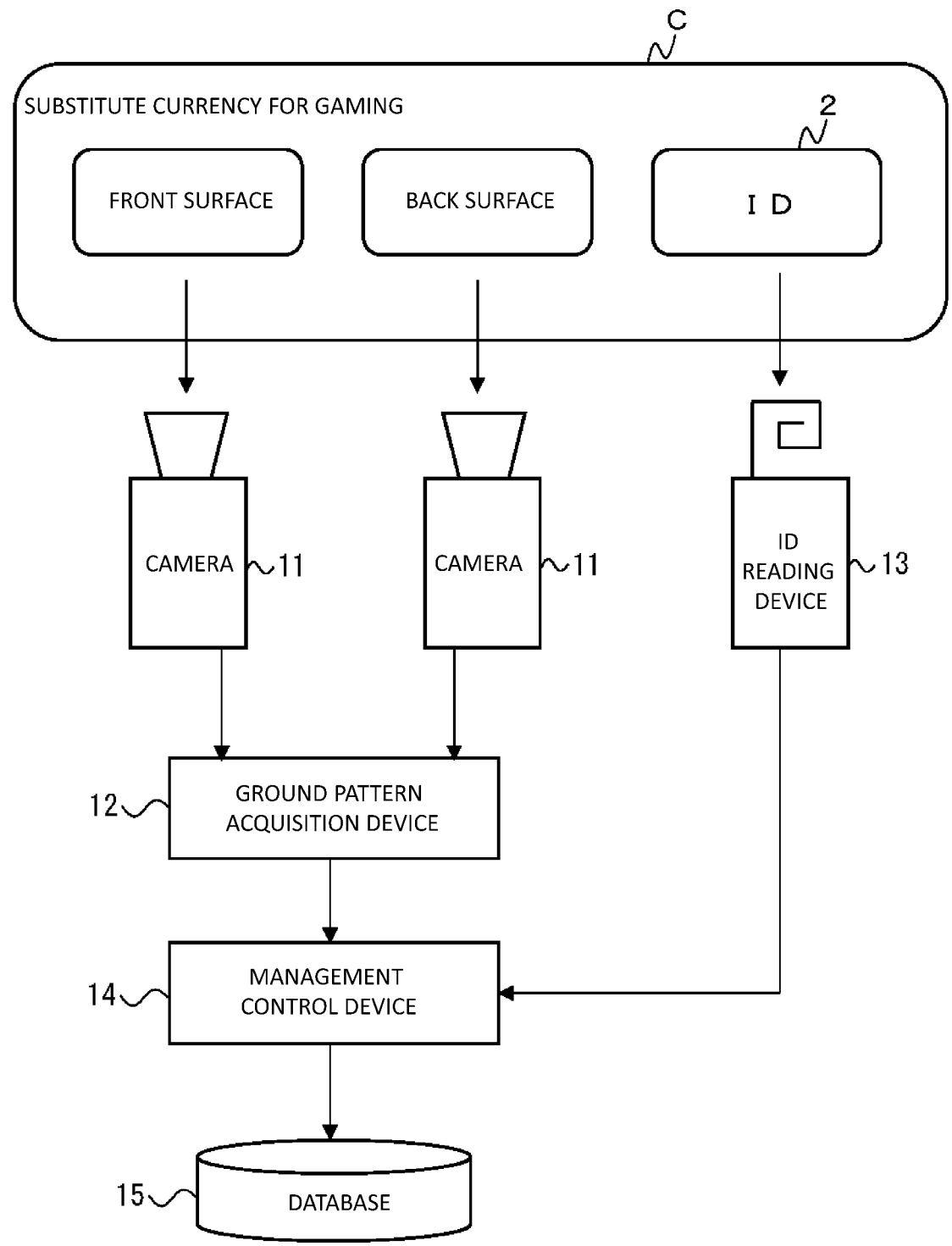
FIG. 5 is a block diagram showing the structure of the management system of an embodiment of the present invention.

Next, the management system, in this embodiment, of the substitute currency C for gaming will be described as follows. FIG. 5 shows a block diagram of the entire system. The management system is equipped with a ground pattern acquiring device 12 that acquires an image of the ground pattern 1 of the substitute currency C for gaming via a camera 11, an ID reader 13 that reads the unique ID 2 of the substitute currency C for gaming, and a management control device 14. The ground pattern acquiring device 12, the ID reading device 13, and the management control device 14 have a composite structure including a computer in one or more configurations, a program, and memory.

The ground pattern acquiring device 12 acquires the pattern 4 of the ground pattern 1 on the front surface of the substitute currency C for gaming and the pattern 4 of the ground pattern 1 on the back surface of the substitute currency C for gaming, each via a camera, and registers them in the database 15 as front pattern information 4$h$ and back pattern information 4$t$. The pattern information 4$h$ and 4$t$ is either numeric data or the image data of the pattern 4 itself. The pattern information 4$h$ and 4$t$ may be feature values extracted from the image.

The ID reader 13 is configured to acquire, via a camera, the individually identifiable unique ID 2 represented in alphanumeric characters on the surface of the substitute currency C for gaming. Alternatively, the ID 2 may be acquired by direct input by a person via a keyboard or the like. The ID 2 may be RFID 10 embedded in the substitute currency C for gaming, and the ID reader 13 may have a function as an RF reader that acquires the information stored in the RFID 10 via an RF antenna.

As shown in FIG. 6, the management control device 14 associates the information 4$h$ and 4$t$ of the pattern 4 of the ground pattern 1 of all substitute currency C for gaming and the unique ID 2 of all substitute currency C for gaming that are expected to be used in the amusement center and stores them in advance in the database 15 (the ID 2 of all substitute currency C for gaming that are expected to be used is registered in the amusement center). It is desirable that the database 15 stores not only the information 4$h$ and 4$t$ of the pattern 4 of the ground pattern 1 on one side of the substitute currency C for gaming, but also the information 4$h$ and 4$t$ of the pattern 4 of the ground pattern 1 on both sides (front and back). In other words, the management control unit 14 should be capable of associating and managing at least three of the patterns 4 of the ground pattern 1 on the surface of the substitute currency C for gaming, the patterns 4 of the ground pattern 1 on the back of the substitute currency C for gaming, and the unique ID 2 of the substitute currency C for gaming on the database 15.

The management control unit 14 identifies the pattern 4 by analyzing the image of the pattern 1 of the substitute currency C for gaming acquired by the ground pattern acquiring device 12 and determining the pattern information 4$h$ and 4$t$. The pattern 4 is identified by means of a program for extracting predetermined characteristic points (differences in light reflectance, distribution of pattern nodes, etc.). The pattern 4 of the substitute currency C for gaming is basically identified by using the pattern 4 of the entire substitute currency C for gaming as the target of judgment, but the pattern 4 of a portion of the substitute currency C for gaming may also be the target of judgment. In this case, the same portion of the substitute currency C for gaming must be determined in advance as the target of judgment. In this case, it is particularly effective to use the relative positional relationship between indication 8 indicating the amount of money etc. printed on the plastic layer 7 of the substitute currency C for gaming. In other words, for example, in FIGS. 3A and 3B, it is set in advance to determine the ground pattern 1 in a predetermined area adjacent to the character (0) at the right end of the indication 8, "100," which indicates the value (amount) of the substitute currency C for gaming, and the information 4$h$ and 4$t$ of the ground pattern 1 in the area are registered in the database 15. By doing so, it is possible to determine the pattern 4 of the substitute currency C for gaming by determining the information 4$h$ and 4$t$ of the pattern 4 in the area, without having to analyze the entire surface of the substitute currency C for gaming.

The management control system 14 may use an artificial intelligence type device with artificial intelligence utilization or deep learning structure to identify the pattern 4. In the artificially intelligent computer or control system or deep learning (structure) technology, it is possible to uniquely identify the pattern 4 of the ground pattern 1 of the substitute currency C for gaming acquired by the ground pattern acquiring device 12 by recognizing the differences between the patterns 4 using a self-learning function or the like.

The management control unit 14 can further search the database 15 based on the ID information of the substitute currency C for gaming to be judged obtained from the ID reader 13 and identify the pattern 4 of the ground pattern 1 associated with said ID 2 on the database 15.

As described above, the management control unit 14 has a function to determine, by searching the database 15, whether or not the pattern 4 of the substitute currency C for gaming identified by image analysis of the ground pattern 1 acquired by the ground pattern acquiring device 12 matches the pattern 4 of the ground pattern 1 associated with the ID information of the substitute currency C for gaming obtained from the ID reader 13. The management control unit 14 has a configuration of performing an authenticity judgment of the substitute currency C for gaming by judging the substitute currency C for gaming as a counterfeit when the pattern 4 of the substitute currency C for gaming identified by image analysis of the ground pattern 1 acquired by the ground pattern acquiring device 12 does not match the pattern 4 of the ground pattern 1 associated with the ID information of the substitute currency C for gaming obtained from the ID reader 13.

The management control unit 14 is preferably configured to perform the authenticity judgement of the substitute currency C for gaming by determining, by searching the database 15, whether or not the pattern 4 on both sides (front and back) of the substitute currency C for gaming identified by image analysis of the ground pattern 1 on both sides (front and back) acquired by the ground pattern acquiring device 12, instead of the pattern 4 of the ground pattern 1 on one side of the substitute currency C for gaming, matches the pattern 4 on both sides (front and back) of the ground pattern 1 associated with the ID information of the substitute currency C for gaming obtained from the ID reader 13.

Figure 7:
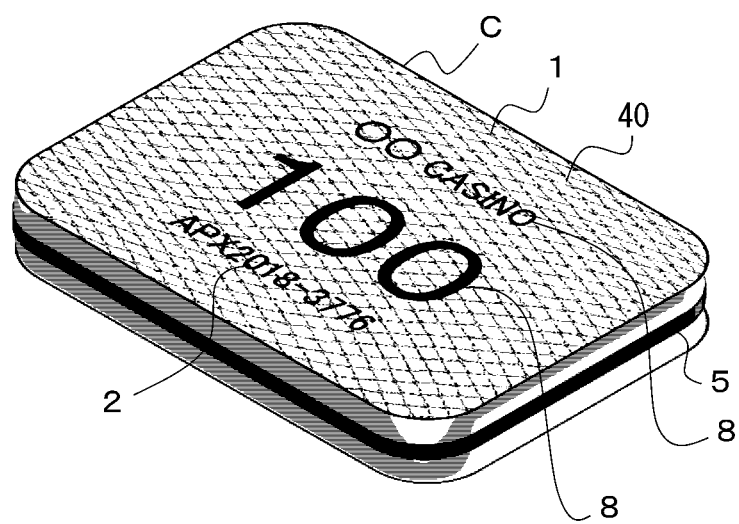
FIG. 7 shows a diagram of the substitute currency for gaming in a variation of the embodiment of the present invention.

A variant of the substitute currency C for gaming will be described below. In the variant shown in FIG. 7, the ground pattern 1 of the substitute currency C for gaming is formed by a lace pattern L formed by crimping lace. The lace pattern L, as shown in FIG. 4, is formed by placing a lace fabric as the layer 6 with the ground pattern 1, and then crimping the lace fabric onto the indication plastic layer 7 to naturally form a unique mesh-like decorative pattern. Due to subtle differences in the placement of the lace fabric during crimping and the non-uniformity of the lace pattern itself, the pattern, like the pearl pattern P, will not be exactly the same, even if it is created using the same manufacturing process. As a result, even in this variant, the ground pattern 1 of the substitute currency C for gaming has the pattern 40 that are difficult to distinguish from each other at first glance, but each of them is not completely identical to the other.

As a management system corresponding to this variation, the management control unit 14, in particular, may be configured to determine the positions of the intersections of the meshes of the lace pattern L and to identify the pattern 40 from the shape of the distribution pattern of the intersections.

The substitute currency C for gaming may be configured with both the pearl pattern P and the lace pattern L, and the management system may also be configured to use both the pearl pattern P and the lace pattern L for determining the authenticity of the substitute currency C for gaming.

Figure 8A:
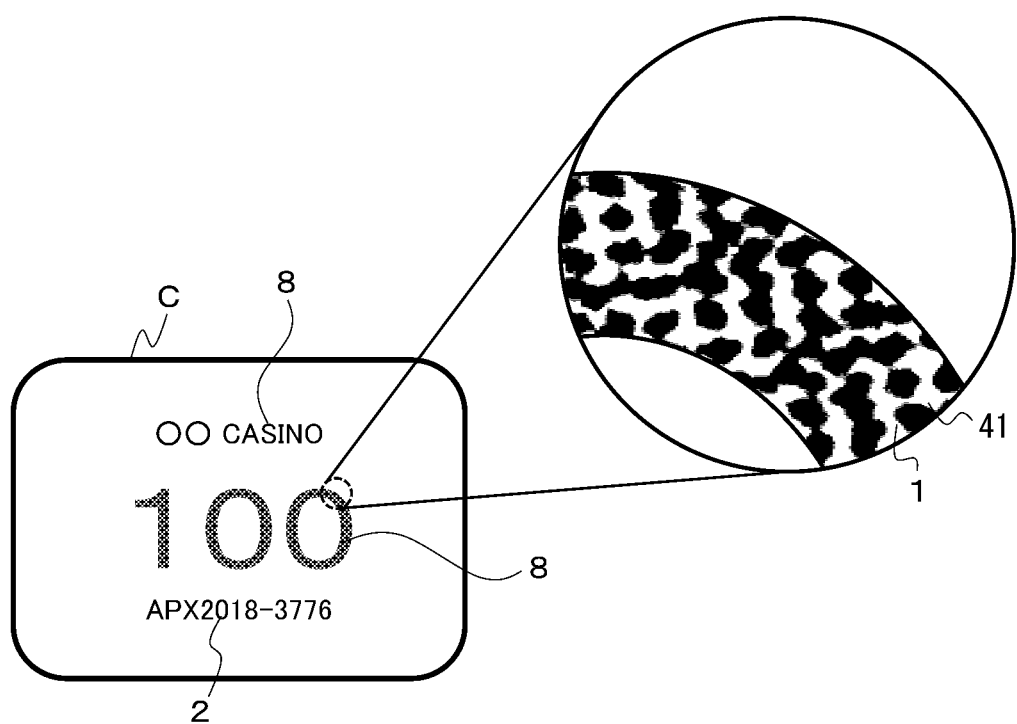
FIG. 8A is a plan view of the substitute currency for gaming of another variation of the form of the present invention.
Figure 8B:
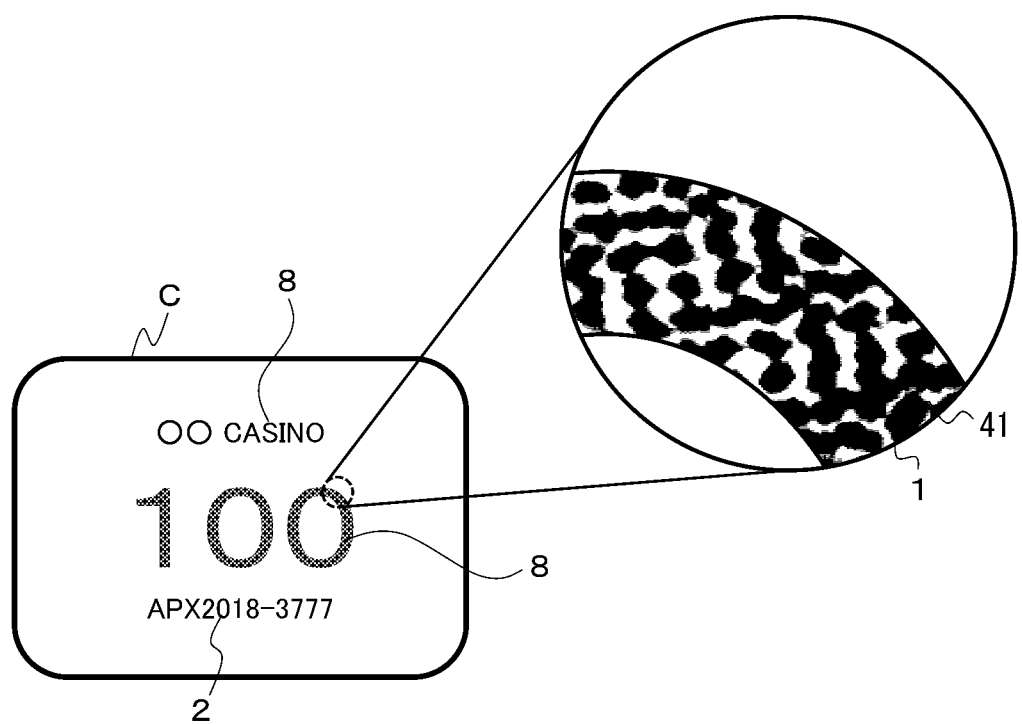
FIG. 8B is a plan view of a substitute currency for gaming with a different pattern than the substitute currency for gaming in FIG. 8A.

FIGS. 8A and 8B show yet another variant. In this variant, the halftone dot pattern of the printing of the indication 8 representing the amount of money, etc. of the substitute currency C for gaming is formed as the ground pattern 1 of the substitute currency C for gaming, and is used for the authenticity determination of the substitute currency C for gaming. In general, in the printing process, a pattern 41 formed of a halftone dot pattern is printed for each printing. It is known that it is difficult to distinguish the patterns 41 by each printing from each other at a distance, but when enlarged, as shown in FIGS. 8A and 8B, a halftone dot pattern is unintentionally formed in which each of them does not completely match each other. Therefore, this halftone dot pattern can be used for authenticity determination in the same way as the pearl pattern P and lace pattern L described above.

As a management system corresponding to this variation, in particular, the management control device 14 can set the halftone dot pattern of a predetermined position of the indication 8 representing the amount of the substitute currency C for gaming, etc., as a judgment position in advance.

In this variation, the layer 6 having the ground pattern 2 is not necessarily required, but the camera 11 and its image analysis may have difficulty in reading the fine halftone dot pattern of the printing, and it is considered advantageous for the image analysis to use it in combination with the pearl pattern P and the lace pattern L of the above embodiments.

In the above embodiment and its variants, pearl patterns, lace patterns, and halftone dot patterns of printing were used, but other individual features that cannot be controlled in manufacturing and are formed naturally, such as misalignment of printing, cutting positions of substitute currency C for gaming, misalignment of cutting positions, defects such as dust and dirt, etc., can be linked to each other or to other unique IDs.

In the above embodiment, we have described an example in which a substitute currency C for gaming has a naturally formed pattern or design, such as a pearl pattern, and also has a unique ID, and the pattern or design and the unique ID are associated and stored in the database 15. However, the present invention is not limited thereto, and it is not necessary that a unique ID be attached to the substitute currency C for gaming for game use. In this case, the database stores the image of the pattern or design itself of the registered substitute currency for gaming or the amount of characteristics extracted from the image.

When the management control unit 14 obtains an image of the pattern or design of the substitute currency C for gaming used in the casino, it refers to the database 15 to determine whether or not the pattern or design appearing in the image are stored in the database 15, thereby to determine whether or not the substitute currency C for gaming is a registered and genuine substitute currency for gaming.

In this case as well, the database 15 may store various identification and attribute information such as the unique ID and value (amount) of the substitute currency for gaming in association with the pattern or design information of the registered substitute currency C for gaming.

REFERENCE NUMERALS

C, Substitute currency for gaming
P, Pearl pattern
L, Lace pattern
1, Ground pattern
2, ID
3, Sheet-like material
4, 40, 41, Pattern
4h, 4t, Pattern information
5, Opaque layer
6, Layer with ground pattern
7, Display plastic layer
8, Indication of amount, etc.
9, Transparent layer
10, RFID
11, Camera
12, Ground pattern acquiring device
13, ID reading device
14, Management control device
15, Database

The invention claimed is:
1. A management system for substitute currency for gaming,
wherein the substitute currency for gaming has one or more ground patterns formed in a manufacturing pro- cess or a material production process, and has a unique ID that can be individually identified,
wherein each ground pattern of the one or more ground patterns is formed randomly,
wherein the substitute currency for gaming further has a multi-layered structure comprising:
a layer having a ground pattern of the one or more ground patterns; and
an indication plastic layer on which an indication of an amount of money of the substitute currency for gaming is printed,
wherein the layer having the ground pattern is located interior to the indication plastic layer in the multi-layered structure, and the ground pattern of the layer can be visually recognized through the indication plastic layer,
wherein the management system comprises:
a ground pattern acquisition device that acquires an image of the ground pattern of the layer via a camera;
an ID reading device that reads the unique ID; and
a management control device that associates the ground pattern and the unique ID and stores them in a database,
wherein the management control device identifies the ground pattern by analyzing the image of the ground pattern acquired by the ground pattern acquisition device, and
wherein the management control device determines whether the identified ground pattern of the substitute currency for gaming matches the ground pattern associated with the unique ID of the substitute currency for gaming obtained from the ID reading device by searching the database, to thereby determine authenticity of the substitute currency for gaming.

2. The management system for substitute currency for gaming according to claim 1,
wherein the multi-layered structure of the substitute currency for gaming further comprises:
an opaque layer in the middle of the multi-layered structure, and
two layers having two respective ground patterns of the one or more ground patterns that are formed randomly, wherein each layer of the two layers is located on a different side of the opaque layer in the multi-layered structure,
wherein one ground pattern of the two ground patterns of the two respective layers is visually recognizable on a front surface of the substitute currency for gaming and the other ground pattern of the two ground patterns of the two respective layers is visually recognizable on a back surface of the substitute currency for gaming, and
wherein the management control device is configured to be able to associate in the database and manage:
the ground pattern visually recognizable on the front surface of the substitute currency for gaming, the ground pattern visually recognizable on the back surface of the substitute currency for gaming, and the unique ID.

3. The management system for substitute currency for gaming according to claim 2, wherein the management control device determines whether a ground pattern visually recognizable on a surface of the substitute currency for gaming matches a ground pattern associated with the ID information of the substitute currency for gaming obtained from the ID reading device by searching the database, to thereby determine authenticity of the substitute currency for gaming.

4. The management system for substitute currency for gaming according to claim 1, wherein the management control device is configured to use artificial intelligence to identify the ground pattern of the substitute currency for gaming by analyzing an image of the ground pattern of the substitute currency for gaming acquired by the ground pattern acquisition device.

5. The management system for managing substitute currency for gaming according to claim 2, wherein the management control device is provided with a function of determining the ground pattern of the substitute currency for gaming by using the relative positional relationship with the indication printed on the indication plastic layer.

6. The management system for substitute currency for gaming purposes according to claim 1, wherein the ground pattern is a pearl pattern.

7. The management system for substitute currency for gaming purposes according to claim 1, wherein the ground pattern is a lace pattern formed by a lace being crimped by the indication plastic layer.

8. The management system for substitute currency for gaming according to claim 2, wherein the ground pattern is formed by a printing dot pattern in the indication of the substitute currency for gaming.

9. The management system for substitute currency for gaming according to claim 1, wherein the unique ID is alphanumeric affixed to the surface of the substitute currency for gaming.

10. The management system for substitute currency for gaming according to claim 1, wherein the unique ID is an RFID.

11. The management system for substitute currency for gaming according to claim 1, wherein:
the substitute currency for gaming has a unique alphanumeric ID attached to its surface and an RFID embedded in it, and
the management control device is provided with a function of allowing the unique alphanumeric ID attached to the surface to be associated with ID information of the RFID and managed in a database.

12. A substitute currency for gaming comprising:
a ground pattern formed in a manufacturing process or a material manufacturing process; and
a unique ID for individual identification, wherein:
the ground pattern is formed randomly, and the substitute currency for gaming can be individually identified by determining the ground pattern and by reading the unique ID, and
the substitute currency for gaming has a structure that allows information of the ground pattern in an image of the ground pattern and information of the unique ID to be associated and managed in a database.

13. A management system for managing substitute currency for gaming with a ground pattern that is formed randomly, the management system comprising:
a ground pattern acquisition device that acquires an image of the ground pattern via a camera; and
a management control device that stores the ground pattern of the substitute currency for gaming in a database, wherein:
the management control device determines the ground pattern by analyzing the image of the ground pattern acquired by the ground pattern acquisition device, the management control device determines whether the ground pattern obtained by the ground pattern acquisition device is stored in the database by analyzing an image of the ground pattern, and based on the determination, determines authenticity of the substitute currency for gaming.

\* \* \* \* \*